United States Patent [19]
Müller

[11] 3,973,593
[45] Aug. 10, 1976

[54] TWO-WAY VALVE FOR A BRAKE BOOSTER
[75] Inventor: Ewald Müller, Neu-Isenburg, Germany
[73] Assignee: ITT Industries, Inc., New York, N.Y.
[22] Filed: Dec. 6, 1974
[21] Appl. No.: 530,339

[30] Foreign Application Priority Data
Feb. 26, 1974 Germany............................ 2409148

[52] U.S. Cl............................ 137/627.5; 91/376 R; 251/231
[51] Int. Cl.² ........................................ F16K 11/14
[58] Field of Search ............... 137/627.5; 91/369 B, 91/376; 251/236–247, 231

[56] References Cited
UNITED STATES PATENTS
2,822,135  2/1958  Winslow ........................ 251/244 X
3,614,911  10/1971  Belart............................... 91/369 B Primary Examiner—Robert G. Nilson
Attorney, Agent, or Firm—John T. O'Halloran; Peter Van Der Sluys; Alfred C. Hill

[57] ABSTRACT

A two-way valve for a brake booster functions first to interrupt a vacuum connection between two chambers when displaced by an actuating rod and second to permit atmosphere to enter into one of the two chambers to provide the booster action. In such known arrangements there is a disadvantage that the brake actuation requires considerable lost brake pedal travel. According to the present invention this disadvantage is overcome by arranging a valve body coaxial of and axially displaced on the actuating rod and by coupling the actuating rod to the valve body by means of a travel-transmission arrangement which provides for a larger displacement travel of the valve body relative to the travel of the actuating rod.

3 Claims, 1 Drawing Figure

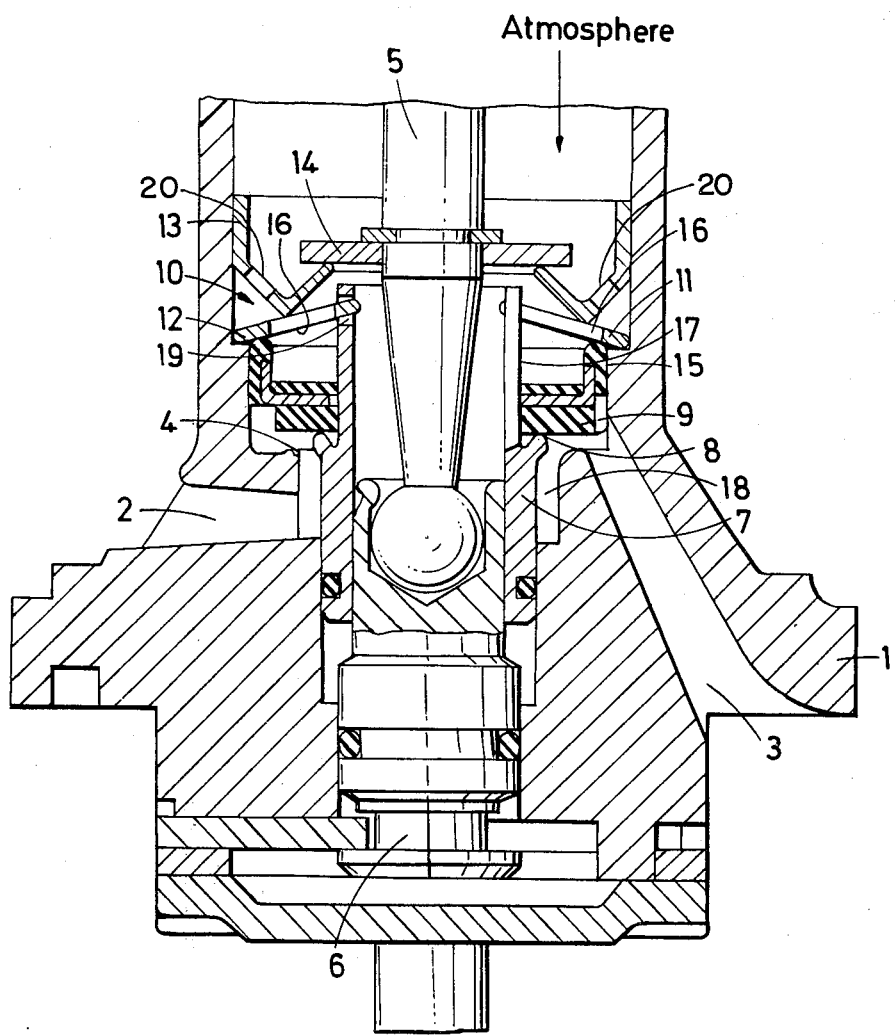

TWO-WAY VALVE FOR A BRAKE BOOSTER

BACKGROUND OF THE INVENTION

This invention relates to a brake booster having a two-way valve which consists of a valve seat mounted on a housing, of a valve body slideable by means of an actuating rod, and of a closing member loaded by spring forces against the valve body, and wherein the closing member is movable onto the valve seat by displacement of the actuating rod, whereupon the valve body is movable away from the closing member.

Such a brake booster is known from the German Pat. No. 1,228,931.

In this known brake booster, the function of the two-way valve is to first interrupt a vacuum connection between two work chambers of the brake booster when displacing the actuating rod, and then second to permit atmospheric pressure to enter into one of the two work chambers that provides the booster action. The disadvantage of this known brake booster lies in that brake application requires considerable lost travel of the brake pedal. This leads to a poor response and/or release behaviour and, consequently, to a large hysteresis of the brake system.

SUMMARY OF THE INVENTION

It is an object of the present invention to provide a brake booster of the type referred to hereinabove, which requires only very short travels to obtain brake-booster response so as to permit short response times.

A further object of the present invention is to provide a brake booster hysteresis as small as possible.

A feature of the present invention is the provision of a two-way valve for a brake booster comprising a housing having a longitudinal axis; a first valve seat formed in the inner surface of the housing coaxial of the axis; an actuating rod extending into the housing coaxial of the axis; a closing member disposed coaxial of the actuating rod within the housing in a valve opening and valve closing relation with the first valve seat; a valve body disposed within the housing coaxial of and axially displaceable on the actuating rod, the valve body having a second valve seat in a valve opening and valve closing relation with the closing member; and a travel-transmission arrangement disposed coaxial of the actuating rod interconnecting the actuating rod and the valve body to provide a larger displacement travel of the valve body relative to the displacement travel of the actuating rod.

The design of the two-way valve of this invention enables to achieve, during displacement of the actuating rod, a more rapid movement of the valve body with the closing member than the actuating rod. The vacuum connection between the two brake-booster chambers will be closed after a very shot displacement of the actuating rod, an atmospheric pressure will be allowed to enter subsequently.

Advantageous embodiments of this invention include among others the arrangement of a slotted disc spring used as a travel-transmission arrangement, which avoids the necessity for additional resilient means for moving the closing member.

BRIEF DESCRIPTION OF THE DRAWING

The above-mentioned and other features and objects of this invention and the manner of obtaining them will become more apparent by reference to the following description taken in conjunction with the drawing, the single FIGURE of which illustrates a longitudinal cross-section of the two-valve control valve for a brake booster in accordance with the principles of the present invention.

DESCRIPTION OF THE PREFERRED EMBODIMENT

The drawing shows only part of the invention brake booster, and more particularly only the two-way valve thereof which is accommodated in a control casing or housing 1. U.S. Pat. No. 3,614,911 is illustrative of the overall brake booster of this invention, whose disclosure is incorporated by reference, with the two-way valve of this invention being substituted for valve mechanism 5 of the cited U.S. patent.

Control casing 1 is firmly connected with a work piston, not shown, to which the servo force generating the boosting effect is applied. In the control casing 1, vacuum channels 2 and 3 are provided establishing a connection between two brake-booster working chambers via a valve seat 4 fastened to casing 1.

Control casing 1 further includes an actuating rod 5 connected to a control piston 6. A valve body 7 is disposed coaxially of and axially slideable on actuating rod 5 or on control piston 6, respectively, which elongates rod 5. Valve body 7 provides a valve seat 8 against which a closing member 9 abuts.

The dimensions and designs of the components named hereinabove are such that during displacement of actuating rod 5 in an operating direction, i.e., downward when viewing the drawing with the drawing sheet being in an upright position, closing member 9 will likewise move downward until it becomes seated on valve seat 4. This blocks the vacuum connection between vacuum channels 2 and 3, i.e., the two brake-booster working chambers no longer communicate with each other. Upon further displacement of actuating rod 5, valve seat 8 will lift itself off closing member 9 because closing member 9 cannot move downward any more, since it rests against valve seat 4. Lifting off of valve seat 8 causes a connection to atmosphere to be opened, thereby permitting one brake-booster work chamber to be applied with outside air having a higher pressure level than that in the other work chamber. The connection to atmosphere for the work chamber connected to channel 2 is through the interior of casing 1, slots 20 of the actuating sleeve 13, slots 16 of slotted disc spring 11 formed from spring material, slot 17 in valve body 7 and annular chamber 18. Channel 3 will not be connected to the atmosphere, since closing member 9 is seated on valve seat 4.

An essential characteristic feature of this invention is the provision of a travel-transmission arrangement 10 disposed between actuating rod 5 and valve body 7. This travel-transmission arrangement 10 includes a slotted disc spring 11 resting with its outer periphery against a stop 12 in control casing 1. Further, disc spring 11 is received in aperture 19 of valve body 7. The actuating sleeve 13 coaxial of rod 5 which is axially slideable in casing 1 touches disc spring 11 in its outer area. When displacing actuating rod 5, actuating sleeve 13 is slideable via a disc 14 serving as a stop for actuating rod 5.

The operation of the travel-transmission herein described is as follows. When actuating rod 5 is displaced in the operating direction, i.e., downward when viewing the drawing, actuating sleeve 13 is displaced by the same amount by means of disc 14. Since actuating sleeve 13 rests against disc spring 11, disc spring 11 is tilted over its stop 12 which is fixed to casing 1, thus, enlarging the axial movement of the actuating rod in proportion to the lever lengths between stop 12 in the control casing 1 and the point of contact on spring 11 of actuating sleeve 13, and in proportion to the lever length between stop 12 and the point where disc spring 11 engage valve body 7. This makes valve body 7 lead the movement of actuating rod 5. Closing member 9 follows the movement of valve body 7, which may be even advanced by a rubber bead 15. It is to be noted that disc spring 11 sifts closing member 9 downward. As soon as closing member 9 has moved against valve seat 4, valve seat 8 will be lifted off of closing member 9, thereby permitting pressure to be applied to that one of the brake-booster work chambers connected to channel 2 as described above.

While I have described above the principles of my invention in connection with specific apparatus it is to be clearly understood that this description is made only by way of example and not as a limitation to the scope of my invention as set forth in the objects thereof and in the accompanying claims.

I claim:
1. A two-way valve for a brake booster comprising:
   a housing having a longitudinal axis;
   a first valve seat formed in the inner surface of said housing coaxial of said axis;
   an actuating rod extending into said housing coaxial of said axis;
   a closing member disposed coaxial of said actuating rod within said housing in a valve opening and valve closing relation with said first valve seat;
   a valve body disposed within said housing coaxial of and axially displaceable on said actuating rod, said valve body having a second valve seat in a valve opening and valve closing relation with said closing member; and
   a travel-transmission arrangement dispoed coaxial of said actuating rod interconnecting said actuating rod and said valve body to provide a larger displacement travel of said valve body relative to the displacement travel of said actuating rod;
   said travel-transmission arrangement including
      a first stop formed in the inner surface of said housing spaced longitudinally from said first valve seat;
      a slotted disc spring disposed coaxial of said actuating rod having its outer periphery resting against said first stop and its inner periphery engaging said valve body at a point spaced longitudinally from said stop, said spring being slanted toward the actuated end of said actuating rod; and
      a force-transmission means connected to said actuating rod abutting against said spring approximately midway of said inner and outer peripheries of said spring.

2. A two-way valve according to claim 1, wherein said force-transmitting means includes
   a second stop secured to said actuating rod spaced from said valve body; and
   an actuating sleeve coaxial of said axis, slideable on the inner surface of said housing and engaging said second stop and said area of said spring, said sleeve being axially slideable by said actuating rod.

3. A two-way valve according to claim 2, wherein said closing member and said spring have a rubber bead disposed in contacting relation therebetween.

* * * * *